US011794525B2

(12) United States Patent
Nakajima et al.

(10) Patent No.: US 11,794,525 B2
(45) Date of Patent: Oct. 24, 2023

(54) TIRE

(71) Applicant: SUMITOMO RUBBER INDUSTRIES, LTD., Hyogo (JP)

(72) Inventors: Sho Nakajima, Hyogo (JP); Koichi Nakajima, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 336 days.

(21) Appl. No.: 17/331,998

(22) Filed: May 27, 2021

(65) Prior Publication Data

US 2021/0387478 A1 Dec. 16, 2021

(30) Foreign Application Priority Data

Jun. 16, 2020 (JP) ................................ 2020-103862

(51) Int. Cl.
*B60C 11/03* (2006.01)
*B60C 11/13* (2006.01)

(52) U.S. Cl.
CPC ........... *B60C 11/03* (2013.01); *B60C 11/0304* (2013.01); *B60C 2011/0341* (2013.01);
(Continued)

(58) Field of Classification Search
CPC ..... B60C 2011/1361; B60C 2011/1353; B60C 2011/0381; B60C 2011/0383;
(Continued)

(56) References Cited

U.S. PATENT DOCUMENTS

2016/0152093 A1* 6/2016 Sakiyama ........... B60C 11/0323
152/209.1
2017/0190220 A1* 7/2017 Ishibashi ............. B60C 11/0302
(Continued)

FOREIGN PATENT DOCUMENTS

| JP | 2015212118 A | * 11/2015 | ............. B60C 11/00 |
|---|---|---|---|
| JP | 2017-210105 A | 11/2017 | |
| JP | 2019-127104 A | 8/2019 | |

OTHER PUBLICATIONS

JP 2015-212118 Machine Translation; Nagayoshi, Katsutomo (Year: 2015).*

*Primary Examiner* — Cedrick S Williams
*Assistant Examiner* — Nicholas J Weiler
(74) *Attorney, Agent, or Firm* — Greenblum & Bernstein, P.L.C.

(57) ABSTRACT

A tire includes a tread portion that includes a first circumferential groove and a first land portion. A groove bottom portion of the first circumferential groove includes a groove bottom reference surface and a plurality of projections projecting outwardly in a tire radial direction from the groove bottom reference surface. The first land portion has at least one first lateral groove extending from the first circumferential groove and terminating within the first land portion. In a tread plan view, an entirety of a first lateral groove extension region obtained by extending a connection portion of the first lateral groove at the first circumferential groove to the groove bottom portion of the first circumferential groove so as to be parallel to a tire axial direction is formed on the groove bottom reference surface.

16 Claims, 5 Drawing Sheets

(52) U.S. Cl.
CPC ............... *B60C 2011/0346* (2013.01); *B60C 2011/0358* (2013.01); *B60C 2011/0365* (2013.01); *B60C 2011/0381* (2013.01); *B60C 2011/1361* (2013.01)

(58) Field of Classification Search
CPC ............ B60C 2011/0346; B60C 11/13; B60C 11/0304; B60C 11/1369
See application file for complete search history.

(56) References Cited

U.S. PATENT DOCUMENTS

2019/0100060 A1* 4/2019 Hokazono ........... B60C 11/1236
2022/0009293 A1* 1/2022 Asano ................. B60C 11/1315

* cited by examiner

US 11,794,525 B2

TIRE

CROSS REFERENCE TO RELATED APPLICATION(S)

The present application claims priority to Japanese patent application JP 2020-103862, filed on Jun. 16, 2020, the entire contents of which is incorporated herein by reference in its entirety.

BACKGROUND

Technical Field

The present disclosure relates to a tire.

Description of the Background Art

Japanese Laid-Open Patent Publication No. 2017-210105 proposes a tire having improved on-snow performance by modifying the arrangement, etc., of main grooves and lateral grooves provided on a tread portion. In addition, Japanese Laid-Open Patent Publication No. 2019-127104 proposes a tire having a plurality of groove bottom protruding portions provided on the groove bottom of a circumferential groove. The tire of Japanese Laid-Open Patent Publication No. 2019-127104 can improve on-snow performance by sticking the groove bottom protruding portions into snow.

In recent years, tires have been required to have further improved on-snow performance. In a tire having a circumferential groove and lateral grooves, in order to improve on-snow performance, it is considered to provide a plurality of projections on a groove bottom portion of the circumferential groove, but a snow column in the groove may be made brittle depending on the arrangement of the projections.

The present disclosure has been made in view of the above-described circumstances, and a main object of the present disclosure is to further improve on-snow performance in a tire having a plurality of projections provided on a groove bottom portion of a circumferential groove.

SUMMARY

The present disclosure is directed to a tire including a tread portion, wherein the tread portion includes a first circumferential groove continuously extending in a tire circumferential direction, and a first land portion adjacent to a first side in a tire axial direction of the first circumferential groove, a groove bottom portion of the first circumferential groove includes a groove bottom reference surface and a plurality of projections projecting outwardly in a tire radial direction from the groove bottom reference surface, the first land portion has at least one first lateral groove extending from the first circumferential groove and terminating within the first land portion, and, in a tread plan view, an entirety of a first lateral groove extension region obtained by extending a connection portion of the first lateral groove at the first circumferential groove to the groove bottom portion of the first circumferential groove so as to be parallel to the tire axial direction is formed on the groove bottom reference surface.

DESCRIPTION OF THE PREFERRED EMBODIMENTS

Hereinafter, an embodiment of the present disclosure will be described with reference to the drawings.

Figure 1:
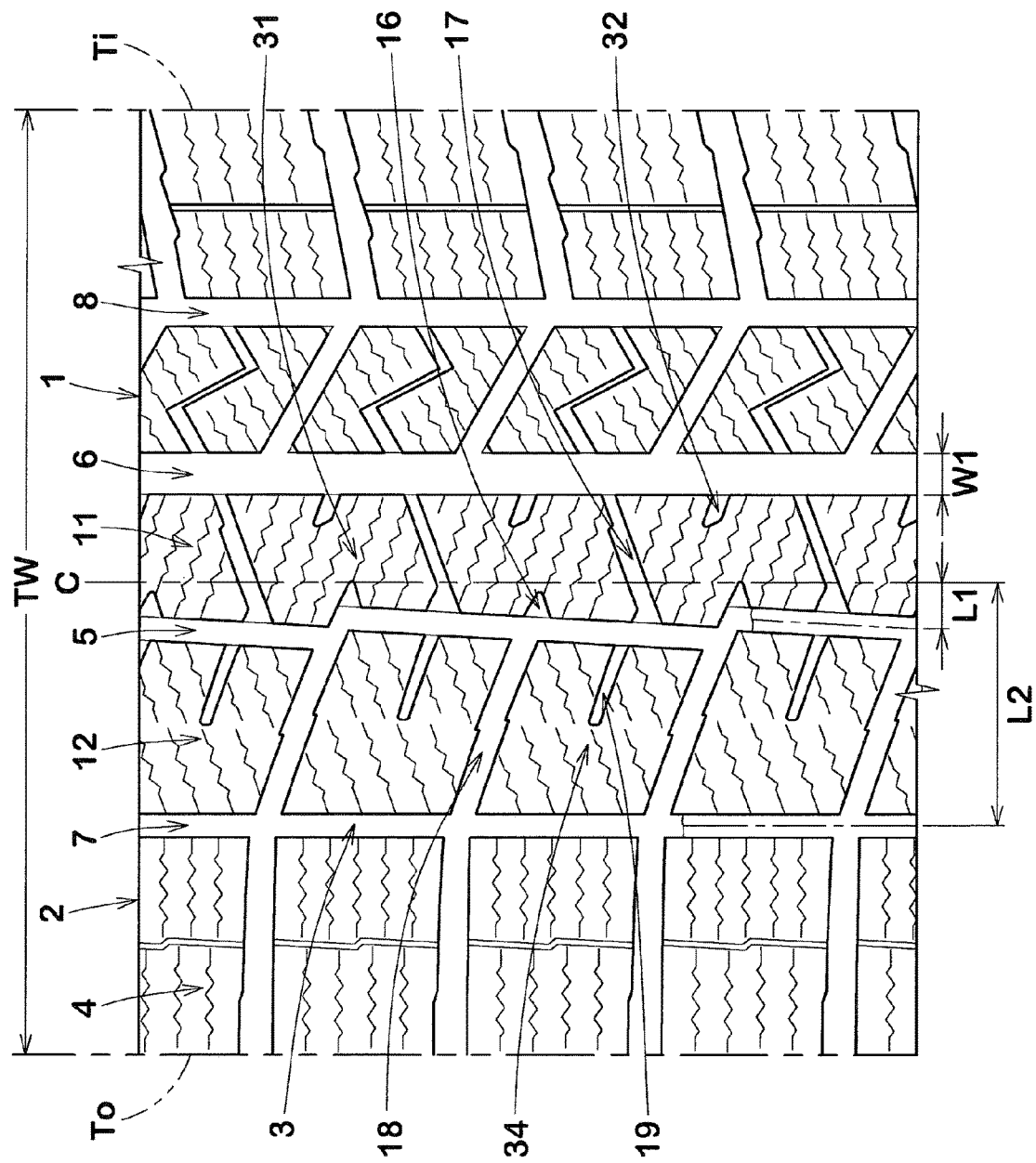
FIG. 1 is a development of a tread portion of a tire according to an embodiment of the present disclosure.

FIG. 1 is a development of a tread portion 2 of a tire 1 according to the present embodiment. As shown in FIG. 1, the tire 1 according to the present embodiment is used, for example, as a pneumatic tire, for a passenger car, which is intended for use in winter. However, the tire 1 according to the present disclosure is not limited to such a mode.

The tire 1 according to the present embodiment has the tread portion 2 having a designated mounting direction to a vehicle, for example. The mounting direction to a vehicle is indicated, for example, on a sidewall portion or the like by characters or marks (not shown).

The tread portion 2 includes four circumferential grooves 3 continuously extending in the tire circumferential direction between an outer tread end To and an inner tread end Ti, and five land portions 4 demarcated by the circumferential grooves 3. That is, the tire 1 according to the present disclosure is configured as a so-called 5-rib tire. However, the tire 1 according to the present disclosure is not limited to such a mode, and may be, for example, a so-called 4-rib tire including three circumferential grooves 3 and four land portions 4.

The outer tread end To is a tread end intended to be located on the outer side of a vehicle when the tire is mounted on the vehicle, and the inner tread end Ti is a tread end intended to be located on the inner side of the vehicle when the tire is mounted on the vehicle. Each of the outer tread end To and the inner tread end Ti corresponds to a ground contact position on the outermost side in the tire axial direction when a normal load is applied to the tire 1 in a normal state and the tire 1 is brought into contact with a flat surface at a camber angle of 0°.

In the case of a pneumatic tire for which various standards are defined, the "normal state" is a state where the tire is fitted on a normal rim and inflated to a normal internal pressure and no load is applied to the tire. In the case of a non-pneumatic tire or a tire for which various standards are not defined, the normal state means a standard use state, corresponding to the purpose of use of the tire, where no load is applied to the tire. In the present specification, unless otherwise specified, dimensions and the like of components of the tire are values measured in the normal state.

The "normal rim" is a rim that is defined, in a standard system including a standard on which the tire is based, by the standard for each tire, and is, for example, the "standard rim" in the JATMA standard, the "Design Rim" in the TRA standard, or the "Measuring Rim" in the ETRTO standard.

The "normal internal pressure" is an air pressure that is defined, in a standard system including a standard on which the tire is based, by the standard for each tire, and is the "maximum air pressure" in the JATMA standard, the maximum value indicated in the table "TIRE LOAD LIMITS AT VARIOUS COLD INFLATION PRESSURES" in the TRA standard, or the "INFLATION PRESSURE" in the ETRTO standard.

In the case of a pneumatic tire for which various standards are defined, the "normal load" is a load that is defined, in a standard system including a standard on which the tire is based, by the standard for each tire, and is the "maximum load capacity" in the JATMA standard, the maximum value indicated in the table "TIRE LOAD LIMITS AT VARIOUS COLD INFLATION PRESSURES" in the TRA standard, or the "LOAD CAPACITY" in the ETRTO standard. In addition, in the case of a non-pneumatic tire or a tire for which various standards are not defined, the "normal load" is a load applied to one tire in a standard use state of tires. The "standard use state" refers to a state where the tires are mounted on a standard vehicle corresponding to the purpose of use of the tires and the vehicle is stationary on a flat road surface in a state where the vehicle can run.

The circumferential grooves 3 include, for example, a first circumferential groove 5, a second circumferential groove 6, a third circumferential groove 7, and a fourth circumferential groove 8. The first circumferential groove 5 is provided between the tire equator C and the outer tread end To. The second circumferential groove 6 is provided on a first side in the tire axial direction (which is the right side in each drawing of the present application) of the first circumferential groove 5. In the present embodiment, the second circumferential groove 6 is provided between the tire equator C and the inner tread end Ti. The third circumferential groove 7 is provided between the first circumferential groove 5 and the outer tread end To. The fourth circumferential groove 8 is provided between the second circumferential groove 6 and the inner tread end Ti.

As for the circumferential grooves 3, various modes, such as grooves extending in a straight manner in the tire circumferential direction and grooves extending in a zigzag manner, can be adopted. In the present embodiment, the first circumferential groove 5 extends in a zigzag manner Meanwhile, the second circumferential groove 6, the third circumferential groove 7, and the fourth circumferential groove 8 extend in a straight manner so as to be parallel to the tire circumferential direction. However, the tire 1 according to the present disclosure is not limited to such a mode.

A distance L1 in the tire axial direction from a groove center line of the first circumferential groove 5 or the second circumferential groove 6 to the tire equator C is, for example, 3% to 15% of a tread width TW. In a preferable mode, the distance in the tire axial direction from the groove center line of the second circumferential groove 6 to the tire equator C is larger than the distance in the tire axial direction from the groove center line of the first circumferential groove 5 to the tire equator C. In addition, a distance L2 in the tire axial direction from a groove center line of the third circumferential groove 7 or the fourth circumferential groove 8 to the tire equator C is, for example, 20% to 35% of the tread width TW. The tread width TW is the distance in the tire axial direction from the outer tread end To to the inner tread end Ti in the normal state.

A groove width W1 of each circumferential groove 3 is preferably at least not less than 3 mm. In a preferable mode, the groove width W1 of each circumferential groove 3 is 2.0% to 5.0% of the tread width TW. In the present embodiment, among the four circumferential grooves 3, the second circumferential groove 6 has the largest groove width.

The land portions 4 include a first land portion 11. The first land portion 11 is adjacent to the first side in the tire axial direction of the first circumferential groove 5. In the present embodiment, the first land portion 11 is demarcated between the first circumferential groove 5 and the second circumferential groove 6. In addition, the land portions 4 include a second land portion 12. The second land portion 12 is adjacent to a second side in the tire axial direction (which is opposite to the first side and is the left side in each drawing of the present application) of the first circumferential groove 5. In the present embodiment, the second land portion 12 is demarcated between the first circumferential groove 5 and the third circumferential groove 7.

Figure 2:
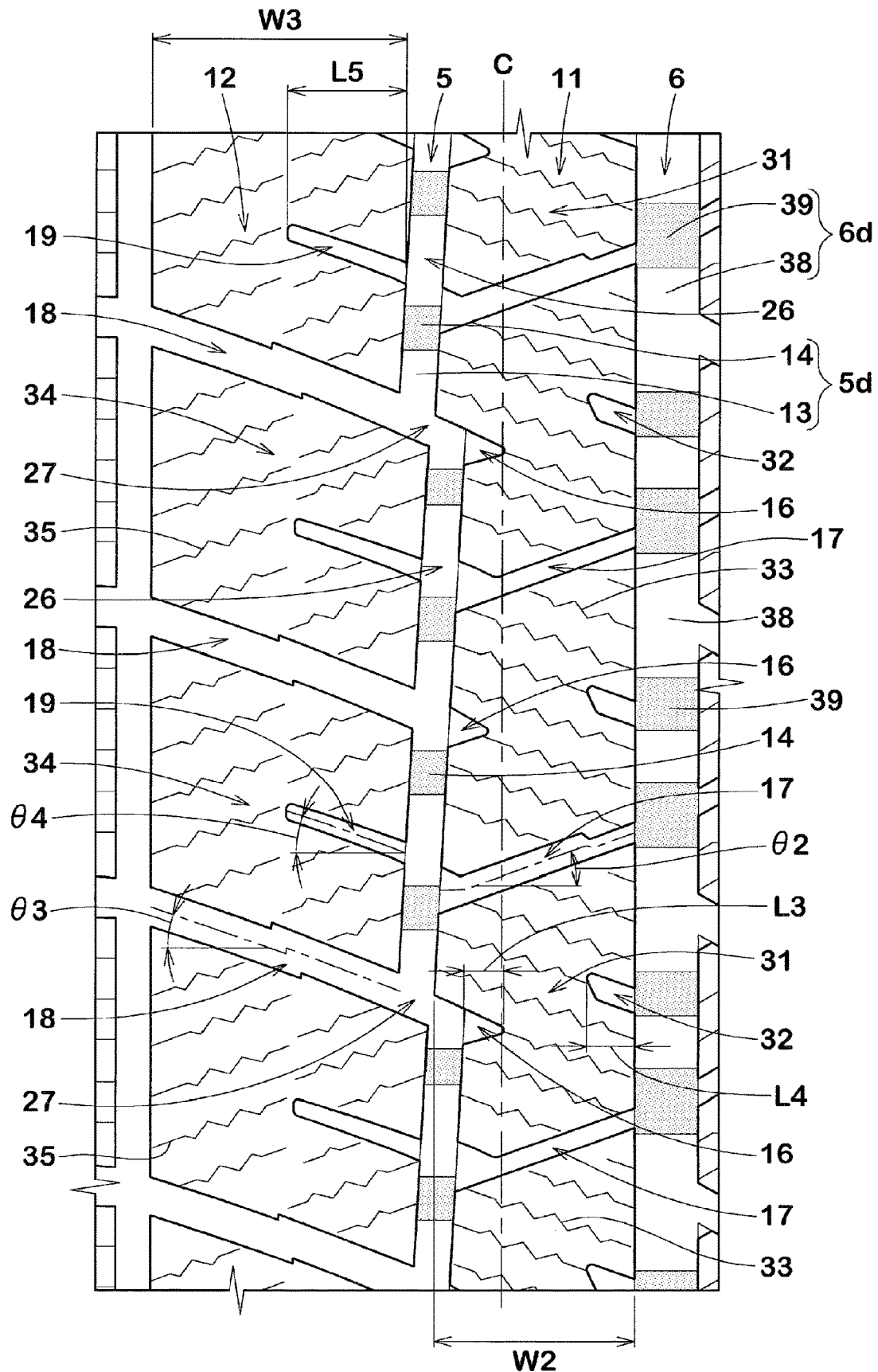
FIG. 2 is an enlarged view of a first circumferential groove, a first land portion, and a second land portion in FIG. 1.
Figure 3:
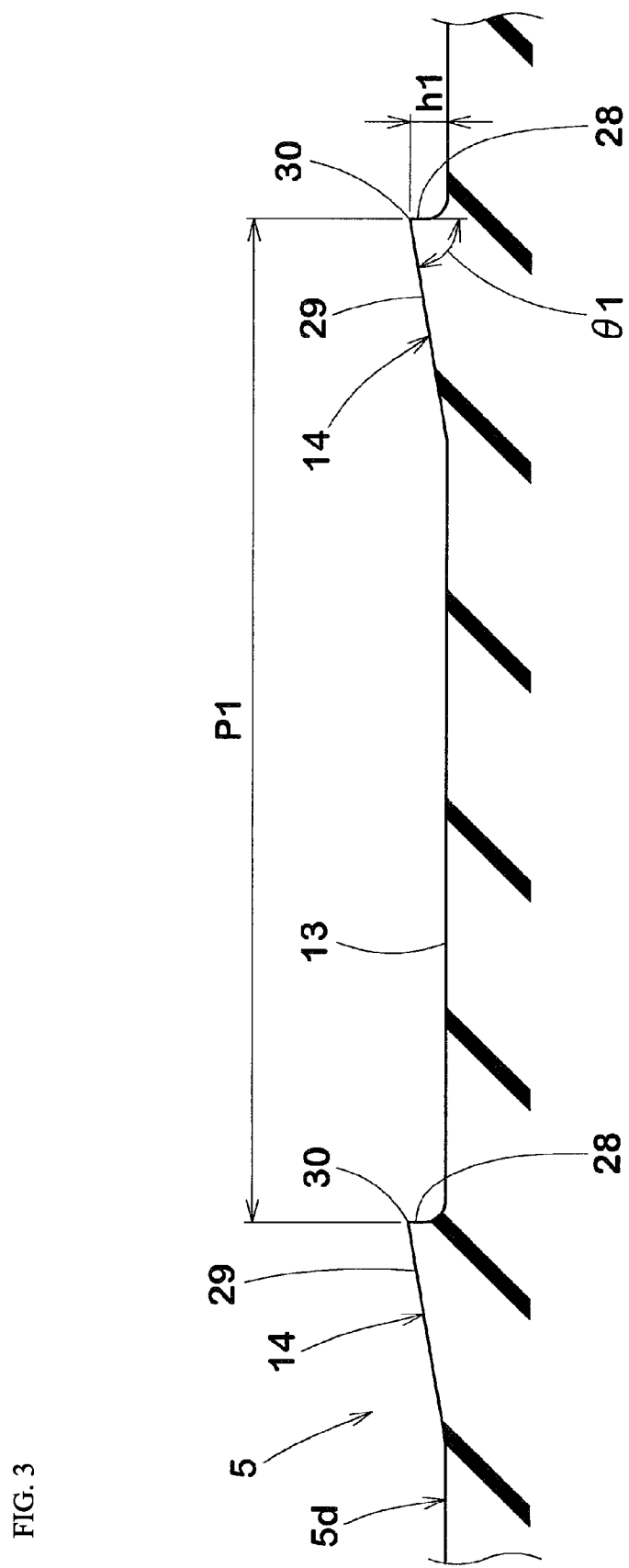
FIG. 3 is a cross-sectional view of the first circumferential groove in FIG. 2 taken along the longitudinal direction thereof.

FIG. 2 shows an enlarged view of the first circumferential groove 5, the first land portion 11, and the second land portion 12. FIG. 3 shows a cross-sectional view of the first circumferential groove 5 taken along the longitudinal direction thereof. As shown in FIG. 2 and FIG. 3, a groove bottom portion 5d of the first circumferential groove 5 includes a groove bottom reference surface 13 and a plurality of projections 14 projecting outwardly in the tire radial direction from the groove bottom reference surface 13. In FIG. 2, the above projections 14 are colored.

As shown in FIG. 2, the first land portion 11 has at least one first lateral groove 16 that extends from the first circumferential groove 5 and terminates within the first land portion 11.

Figure 4:
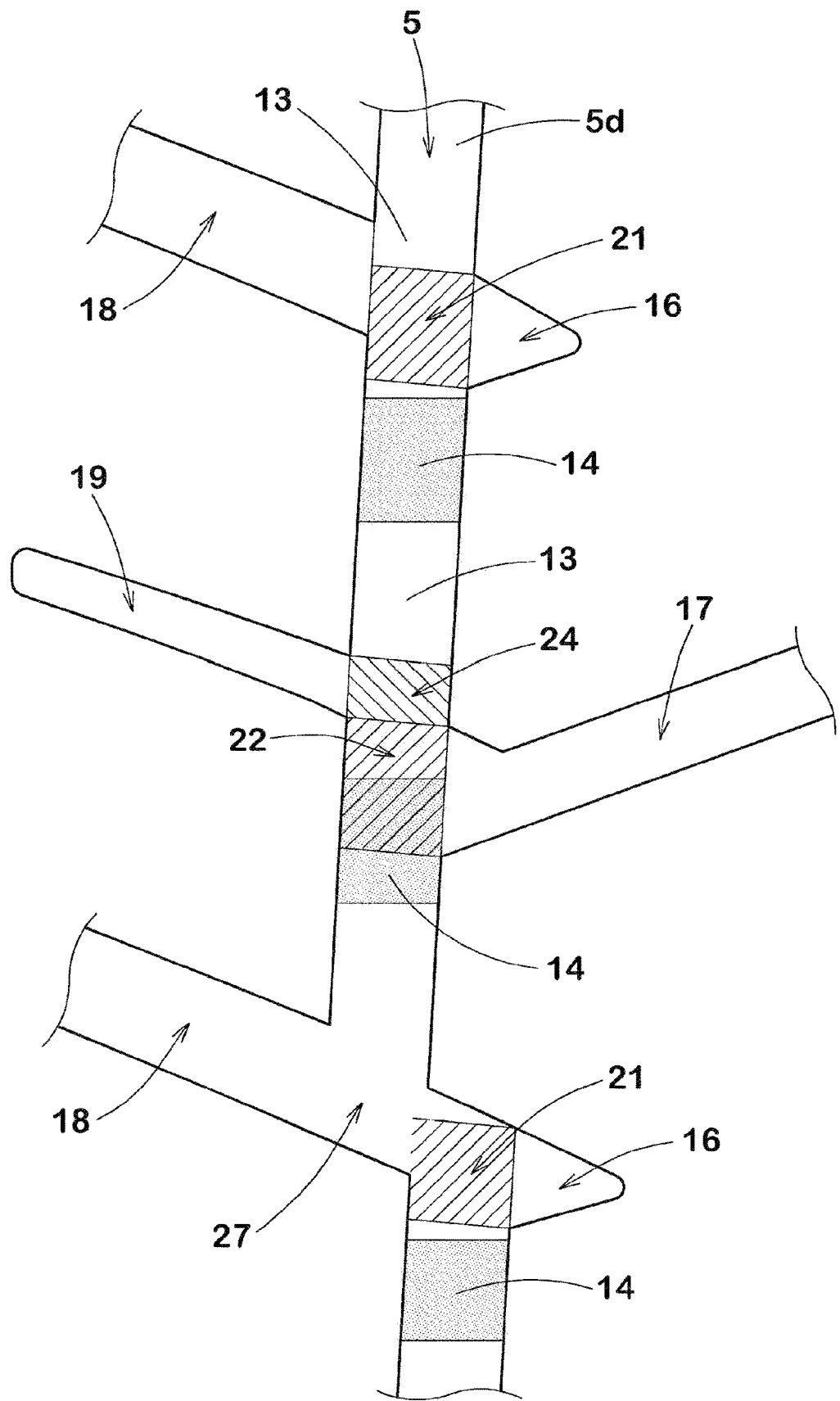
FIG. 4 is an enlarged view showing the contour of the first circumferential groove in FIG. 2.

FIG. 4 shows an enlarged view showing the contour of the first circumferential groove 5. In FIG. 4, sipes provided on the land portions are not shown. As shown in FIG. 4, in a tread plan view, the entirety of a first lateral groove extension region 21 (to which thin slanted lines are added in FIG. 4) obtained by extending a connection portion of each first lateral groove 16 at the first circumferential groove 5 to the groove bottom portion 5d of the first circumferential groove 5 so as to be parallel to the tire axial direction is formed on the groove bottom reference surface 13. In other words, the projections 14 (colored in FIG. 4, similar to FIG. 2) are not formed in the first lateral groove extension region 21. As a result of adopting the above configuration, the tire 1 according to the present disclosure can exhibit excellent on-snow performance. As for the reason for this, the following mechanism is inferred.

During running on snow, the tire according to the present disclosure can generate large reaction force in the tire circumferential direction by the projections 14, which are provided in the groove bottom portion 5d of the first circumferential groove 5, pushing away a snow column compacted in the first circumferential groove 5, thereby exhibiting excellent on-snow performance.

Meanwhile, during running on snow, in the first lateral groove extension region 21, a harder snow column tends to be generated as compared to those in the other parts. In the present disclosure, since the entirety of the first lateral groove extension region 21 is formed on the groove bottom reference surface 13, a lot of snow easily enters the first lateral groove extension region 21, and as a result, larger snow column shearing force can be generated. Owing to such an action, excellent on-snow performance is exhibited. In addition, with such a configuration, movement of water from the first circumferential groove 5 to the first lateral groove 16 is not hindered by the projections 14, and wet performance is maintained.

Hereinafter, more detailed configurations of the present embodiment will be described. The configurations described below show a specific mode of the present embodiment. Therefore, it is needless to say that the present disclosure can achieve the above-described effect even when the configurations described below are not provided. In addition, even when any one of the configurations described below is independently applied to the tire according to the present disclosure having the above-described characteristics, performance improvement corresponding to each configuration can be expected. Furthermore, when some of the configurations described below are applied in combination, complex performance improvement corresponding to each configuration can be expected.

As shown in FIG. 2, the first circumferential groove 5 includes first inclined portions 26 inclined relative to the tire circumferential direction, and second inclined portions 27 inclined at a larger angle relative to the tire circumferential direction than the first inclined portions 26, and the first inclined portions 26 and the second inclined portions 27 are provided alternately in the tire circumferential direction.

The angle of each first inclined portion 26 relative to the tire circumferential direction is, for example, not greater than 10°. The angle of each second inclined portion 27 relative to the tire circumferential direction is, for example, 60 to 80°. The first inclined portions 26 and the second inclined portions 27 are inclined in directions opposite to each other, relative to the tire circumferential direction. The angles between the first inclined portions 26 and the second inclined portions 27 are, for example, 100 to 120°. The length of each second inclined portion 27 is smaller than the length of each first inclined portion 26. Accordingly, during running on snow, a hard snow column is generated in each second inclined portion 27, so that on-snow performance is improved. In the present specification, the angle of the groove or the length of the groove is measured at a groove center line thereof.

As shown in FIG. 3, each projection 14 provided in the groove bottom portion 5d of the first circumferential groove 5 includes a first surface 28 extending in the tire radial direction, and a second surface 29 extending at a larger angle relative to the tire radial direction than the first surface 28, in the cross-section of the first circumferential groove 5 along the longitudinal direction thereof. In the present embodiment, the first surface 28 includes a region orthogonal to the tire circumferential direction, in at least a part thereof. The first surface 28 of each projection 14 of the first circumferential groove 5 faces the first side in the tire circumferential direction (the right side in FIG. 3). In addition, the first surface 28 and the second surface 29 are connected to each other via a ridge line portion 30 extending in the tire axial direction. The ridge line portion 30 extends in the groove bottom portion 5d of the first circumferential groove 5 over the entire groove width thereof. Such a projection 14 effectively improves traction performance or braking performance on snow.

An angle θ1 between the first surface 28 and the second surface 29 is, for example, 80 to 110°. A maximum height h1 of each projection 14 is, for example, 5% to 15% of the maximum depth of the first circumferential groove 5. Such a projection 14 can enhance on-snow performance while maintaining the drainage performance of the first circumferential groove 5.

As shown in FIG. 2, each projection 14 is provided in the first inclined portion 26, and is not provided in the second inclined portion 27. In addition, the number of projections 14 provided in one first inclined portion 26 is, for example, 2 to 6, and preferably 3 to 5. Moreover, an arrangement pitch P1 (shown in FIG. 3) between the projections 14 adjacent to each other in the tire circumferential direction is 20% to 30% of the length in the tire circumferential direction of the first inclined portion 26. The arrangement of such projections 14 serves to improve wet performance and on-snow performance in a well-balanced manner.

At least one first lateral groove 16 communicates with the second inclined portion 27 of the first circumferential groove 5. Specifically, as shown in FIG. 4, the first lateral groove extension region 21 overlaps at least a part of the second inclined portion 27. Accordingly, the second inclined portion 27 and the first lateral groove 16 cooperate to generate a harder snow column, so that on-snow performance is improved. In the present embodiment, the first lateral grooves 16 that communicate with the second inclined portions 27 and the first lateral grooves 16 that communicate with the first inclined portions 26 are provided alternately in the tire circumferential direction.

As shown in FIG. 2, each first lateral groove 16, for example, terminates on the first circumferential groove 5 side with respect to the center position in the tire axial direction of the first land portion 11. A length L3 in the tire axial direction of the first lateral groove 16 is, for example, 15% to 30% of a maximum width W2 in the tire axial direction of the first land portion 11. Such a first lateral groove 16 can enhance on-snow performance while maintaining the stiffness of the first land portion 11.

Each first lateral groove 16 has, for example, a groove width that decreases toward the first side in the tire axial direction. In the present embodiment, each first lateral groove 16 has two groove edges that are not parallel to each other, and the groove width of the first lateral groove 16 continuously decreases toward the first side in the tire axial direction. One groove edge of the first lateral groove 16 is inclined in the same direction relative to the tire axial direction as the second inclined portion 27 of the first lateral groove 16, and the other groove edge of the first lateral groove 16 is inclined in the direction opposite to that of the one groove edge, relative to the tire axial direction. The angle between the two groove edges of the first lateral groove 16 is, for example, 30 to 50°. In such a first lateral groove 16, snow can be strongly compacted by being compressed from the second inclined portion 27 side.

The first land portion 11 has at least one second lateral groove 17 fully traversing the first land portion 11. In the present embodiment, the first land portion 11 has a plurality of second lateral grooves 17. Accordingly, the first land portion 11 includes first blocks 31 demarcated by the plurality of second lateral grooves 17.

The second lateral grooves 17 are, for example, inclined in the direction opposite to that of the second inclined portions 27 of the first circumferential groove 5, relative to the tire axial direction. An angle θ2 of each second lateral groove 17 relative to the tire axial direction is, for example, 10 to 30°.

The groove width of a connection portion of each second lateral groove 17 at the first circumferential groove 5 preferably increases toward the first circumferential groove 5 side. Accordingly, the second lateral groove 17 and the first circumferential groove 5 can cooperate to generate a hard snow column. In addition, during running on a wet road surface, water in the first circumferential groove 5 easily moves to the second lateral groove 17 side, so that wet performance is improved.

As shown in FIG. 4, at least a part of the projection 14 preferably overlaps a second lateral groove extension region 22 (to which thin slanted lines are added in FIG. 4) obtained by extending the connection portion of the second lateral groove 17 at the first circumferential groove 5 to the groove bottom portion 5d of the first circumferential groove 5 so as to be parallel to the tire axial direction. Accordingly, clogging of the connection portion of the second lateral groove 17 with snow can be suppressed, so that excellent on-snow performance is continuously exhibited.

As shown in FIG. 2, each first block 31 has a short termination groove 32 that extends from the second circumferential groove 6 and terminates within the first block 31. The short termination groove 32 terminates on the second circumferential groove 6 side with respect to the center position in the tire axial direction of the first land portion 11. A length L4 in the tire axial direction of the short termination groove 32 is, for example, 15% to 30% of the maximum width W2 in the tire axial direction of the first land portion 11. Such a short termination groove 32 can enhance on-snow performance while maintaining the stiffness of the first land portion 11.

The short termination groove 32 is, for example, inclined relative to the tire axial direction. The short termination groove 32 of the present embodiment is inclined in the same direction as the second inclined portion 27 of the first circumferential groove 5, and the angle difference between these grooves is, for example, not greater than 10°. In addition, the angle of the short termination groove 32 relative to the tire axial direction is, for example, 10 to 30°. Such a short termination groove 32 improves traction performance and turning performance on snow in a well-balanced manner.

The first block 31 has a plurality of sipes 33. In the present specification, the "sipe" refers to a cut element having a minute width and having a width of 1.5 mm or less between two sipe walls facing each other. The width of the sipe is preferably 0.1 to 1.0 mm and more preferably 0.2 to 0.4 mm. The width of the sipe of the present embodiment is in the above range over the entire depth thereof. In the present specification, in a transverse cross-section of a certain cut element, when a region with a width of 1.5 mm or less is included over 50% or more of the entire depth, even if a region with a width exceeding 1.5 mm is partially included, the cut element is treated as a sipe (sipe including a groove element). In addition, in a transverse cross-section of a certain cut element, when a region with a width larger than 1.5 mm is included over 50% or more of the entire depth, even if a region with a width of 1.5 mm or less is partially included, the cut element is treated as a groove (groove including a sipe element).

Each sipe 33 is, for example, inclined in the same direction relative to the tire axial direction as the second inclined portion 27. In addition, each sipe 33 of the present embodiment extends in a zigzag manner in a tread plan view. The sipe 33 may be formed, for example, as a so-called 3D sipe extending in a zigzag manner in the longitudinal direction and the depth direction thereof. Such a sipe 33 can enhance on-ice performance while maintaining the stiffness of the first land portion 11.

The second land portion 12 has a plurality of third lateral grooves 18 that fully traverse the second land portion 12, and a plurality of fourth lateral grooves 19 that are connected to the first circumferential groove 5 and terminate within the second land portion 12.

Each third lateral groove 18 is, for example, inclined relative to the tire axial direction. The third lateral groove 18 is inclined in the same direction relative to the tire axial direction as the second inclined portion 27 of the first circumferential groove 5. Accordingly, each second lateral groove 17 and each third lateral groove 18 are inclined in directions opposite to each other, relative to the tire axial direction. An angle θ3 of the third lateral groove 18 relative to the tire axial direction is, for example, 15 to 30°. Such a third lateral groove 18 improves traction performance and turning performance on snow in a well-balanced manner.

At least one third lateral groove 18 communicates with the second inclined portion 27, for example. In the present embodiment, the third lateral grooves 18 that communicate with the second inclined portions 27 and the third lateral grooves 18 that communicate with the first inclined portions 26 are provided alternately in the tire circumferential direction.

Each third lateral groove 18 faces the first lateral groove 16 across the first circumferential groove 5. This configuration means a mode in which a virtual region obtained by extending the third lateral groove 18 along the longitudinal direction thereof to the first land portion 11 side overlaps at least a part of the first lateral groove 16. Accordingly, the third lateral groove 18, the first circumferential groove 5, and the first lateral groove 16 can cooperate to form a hard snow column, and as a result, on-snow performance is further improved.

Each fourth lateral groove 19 is, for example, inclined relative to the tire axial direction. The fourth lateral groove 19 is inclined in the same direction relative to the tire axial direction as the second inclined portion 27 of the first circumferential groove 5. Accordingly, the fourth lateral groove 19 is inclined in the same direction relative to the tire axial direction as the third lateral groove 18. An angle θ4 of the fourth lateral groove 19 relative to the tire axial direction is, for example, 15 to 30°.

A length L5 in the tire axial direction of each fourth lateral groove 19 is, for example, 40% to 60% of a maximum width W3 in the tire axial direction of the second land portion 12. In addition, the maximum groove width of each fourth lateral groove 19 is smaller than the maximum groove width of each third lateral groove 18. Such a fourth lateral groove 19 can enhance on-snow performance while maintaining the stiffness of the second land portion 12.

As shown in FIG. 4, in a tread plan view, the entirety of a fourth lateral groove extension region 24 (to which thin slanted lines are added in FIG. 4) obtained by extending a connection portion of each fourth lateral groove 19 at the first circumferential groove 5 to the groove bottom portion 5d of the first circumferential groove 5 so as to be parallel to the tire axial direction is preferably formed on the groove bottom reference surface 13. Accordingly, a hard snow column can be generated in the fourth lateral groove extension region 24. In addition, the above configuration makes it easier for water to move from the first circumferential groove 5 to the fourth lateral groove 19 side and serves to also improve wet performance.

As shown in FIG. 2, the second land portion 12 includes a plurality of second blocks 34 demarcated by the plurality of third lateral grooves 18. Each second block 34 has a plurality of sipes 35. Each sipe 35 provided on the second block 34 is inclined in the direction opposite to that of the second inclined portion 27, relative to the tire axial direction. As for the other confirmation, the configuration of each of the sipes 33 provided on the above-described first blocks 31 can be applied to the sipes 35 provided on the second blocks 34.

The groove width of the second circumferential groove 6 is larger than the groove width of the first circumferential groove 5. The groove width of the second circumferential groove 6 is preferably 1.5 to 2.0 times the groove width of the first circumferential groove 5. Such a second circumferential groove 6 serves to enhance on-snow performance and wet performance.

A groove bottom portion 6d of the second circumferential groove 6 includes a groove bottom reference surface 38 and a plurality of projections 39 projecting outwardly in the tire radial direction from the groove bottom reference surface 38. The configuration of each projection 14 of the above-described first circumferential groove 5 can be applied to each projection 39 of the second circumferential groove 6. The second circumferential groove 6 having such projections 39 can enhance traction performance and braking performance on snow.

In a more preferable mode, the first surface 28 of each projection 14 of the first circumferential groove 5 faces the first side in the tire circumferential direction, and the first surface of each projection 39 of the second circumferential groove 6 faces the second side in the tire circumferential direction which is opposite to the first side. Accordingly, traction performance and braking performance on snow are improved in a well-balanced manner.

Each projection 39 of the second circumferential groove 6 preferably overlaps at least a part of a region obtained by extending the connection portion of the second lateral groove 17 or the short termination groove 32 at the second circumferential groove 6 to the groove bottom portion 6d of the second circumferential groove 6 so as to be parallel to the tire axial direction. The arrangement of such projections 39 can suppress clogging of the second lateral grooves 17 and the short termination grooves 32 with snow, so that excellent on-snow performance is continuously exhibited.

Although the tire according to the embodiment of the present disclosure has been described in detail above, the present disclosure is not limited to the above specific embodiment, and various modifications can be made to implement the present disclosure.

EXAMPLES

Figure 5:
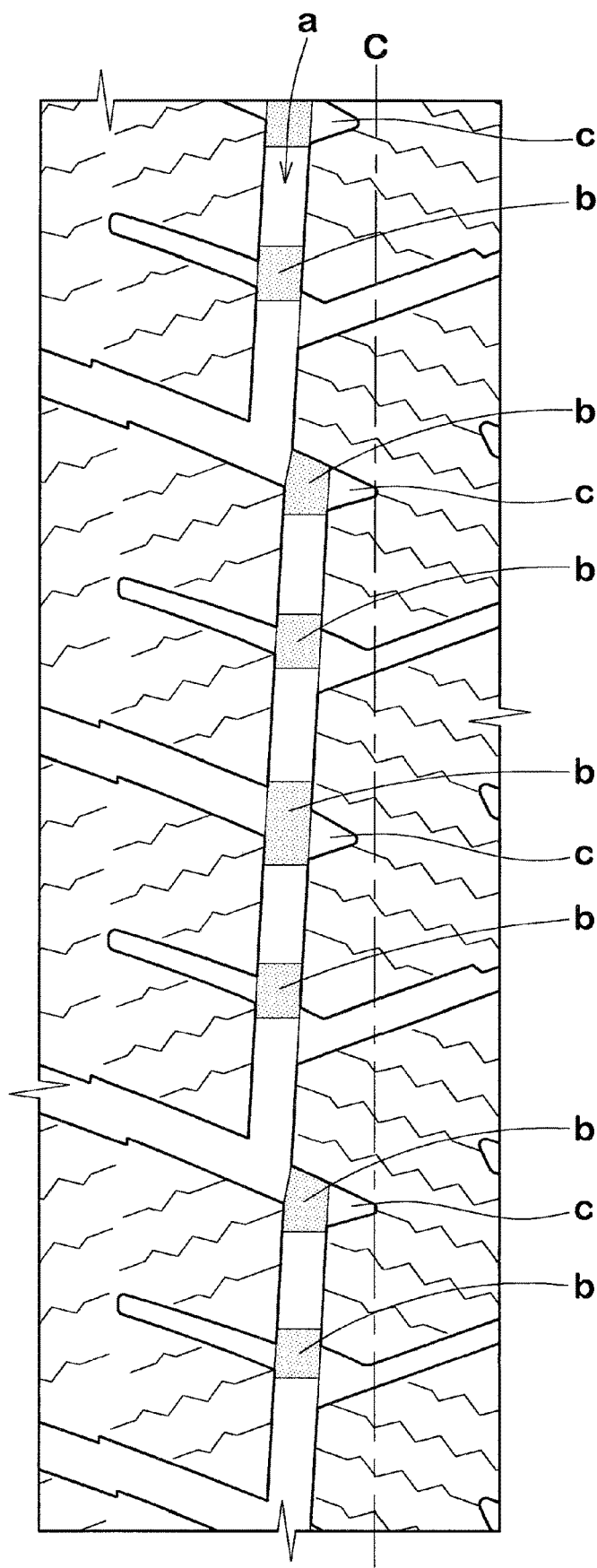
FIG. 5 is an enlarged view of a first circumferential groove of a comparative example.

Tires with a size of 195/65R15 having the basic tread pattern in FIG. 1 were produced as test tires on the basis of specifications in Table 1. As a comparative example, a tire having a first circumferential groove a shown in FIG. 5 was produced as a test tire. As shown in FIG. 5, each projection b of the first circumferential groove a overlaps a first lateral groove extension region obtained by extending a first lateral groove c of the comparative example to a groove bottom portion of the first circumferential groove a so as to be parallel to the tire axial direction. The tire of the comparative example has substantially the same pattern as shown in FIG. 1, except for the above-described configuration. Each test tire was tested for on-snow performance and wet performance. The common specifications and the test methods for the respective test tires are as follows.

Mount rim: 15×6.0 JJ
Tire internal pressure: 230 kPa for front wheels, 230 kPa for rear wheels
Test vehicle: a front-wheel-drive car having an engine displacement of 1500 cc
Tire mounted position: all wheels <On-Snow Performance>

Sensory evaluation was made by a driver for on-snow performance when the test vehicle ran on snow. The results are shown as scores with the result of the comparative example being regarded as 100. A higher value indicates that the on-snow performance is better.

<Wet Performance>

Sensory evaluation was made by a driver for wet performance when the test vehicle ran on a wet road surface. The results are shown as scores with the result of the comparative example being regarded as 100. A higher value indicates that the wet performance is better.

The test results are shown in Table 1.

TABLE 1

| | Comparative Example | Example 1 | Example 2 | Example 3 | Example 4 | Example 5 | Example 6 | Example 7 | Example 8 | Example 9 |
|---|---|---|---|---|---|---|---|---|---|---|
| Drawing showing first circumferential groove | FIG. 5 | FIG. 2 | FIG. 2 | FIG. 2 | FIG. 2 | FIG. 2 | FIG. 2 | FIG. 2 | FIG. 2 | FIG. 2 |
| Height h1 of projection/depth of first circumferential groove (%) | 9 | 9 | 5 | 10 | 15 | 20 | 9 | 9 | 9 | 9 |
| Number of projections provided in first inclined portion | 3 | 4 | 4 | 4 | 4 | 4 | 2 | 3 | 5 | 6 |
| On-snow performance (scores) | 100 | 106 | 103 | 106 | 106 | 107 | 103 | 105 | 106 | 107 |
| Wet performance (scores) | 100 | 103 | 104 | 103 | 102 | 100 | 104 | 104 | 102 | 101 |

As shown in Table 1, it is confirmed that the tire of each Example exhibits excellent on-snow performance. In addition, it is also confirmed that the tire of each Example maintains wet performance.

In the tire according to the present disclosure, preferably, the first circumferential groove includes first inclined portions inclined relative to the tire circumferential direction and second inclined portions inclined at a larger angle relative to the tire circumferential direction than the first inclined portions, and the first inclined portions and the second inclined portions are provided alternately in the tire circumferential direction.

In the tire according to the present disclosure, the first lateral groove preferably communicates with the second inclined portion.

In the tire according to the present disclosure, the first land portion preferably has at least one second lateral groove fully traversing the first land portion.

In the tire according to the present disclosure, in a tread plan view, at least a part of the projection preferably overlaps a second lateral groove extension region obtained by extending a connection portion of the second lateral groove at the first circumferential groove to the groove bottom portion of the first circumferential groove so as to be parallel to the tire axial direction.

In the tire according to the present disclosure, preferably, the tread portion includes a second land portion adjacent to a second side in the tire axial direction of the first circumferential groove, and the second land portion has a plurality of third lateral grooves fully traversing the second land portion.

In the tire according to the present disclosure, each third lateral groove preferably faces the first lateral groove across the first circumferential groove.

In the tire according to the present disclosure, preferably, the first circumferential groove includes first inclined portions inclined relative to the tire circumferential direction and second inclined portions inclined at a larger angle relative to the tire circumferential direction than the first inclined portions, the first inclined portions and the second inclined portions being provided alternately in the tire circumferential direction, and the third lateral grooves communicate with the second inclined portions.

In the tire according to the present disclosure, preferably, a groove width of the first lateral groove continuously decreases toward the first side in the tire axial direction, and an angle between two groove edges of the first lateral groove is 30 to 50°.

In the tire according to the present disclosure, a length in the tire axial direction of the first lateral groove is preferably 15% to 30% of a maximum width in the tire axial direction of the first land portion.

In the tire according to the present disclosure, preferably, the tread portion includes a second land portion adjacent to the second side in the tire axial direction of the first circumferential groove, and the second land portion has a plurality of fourth lateral grooves connected to the first circumferential groove and terminating within the second land portion.

In the tire according to the present disclosure, in a cross-section of the first circumferential groove along a longitudinal direction thereof, each projection preferably includes a first surface extending in the tire radial direction, and a second surface extending at a larger angle relative to the tire radial direction than the first surface.

In the tire according to the present disclosure, preferably, the tread portion includes a second circumferential groove adjacent to the first side of the first land portion and extending in the tire circumferential direction, and a groove bottom portion of the second circumferential groove includes a groove bottom reference surface and a plurality of projections projecting outwardly in the tire radial direction from the groove bottom reference surface.

In the tire according to the present disclosure, in a cross-section of the first circumferential groove or the second circumferential groove along a longitudinal direction thereof, each of the projections of the first circumferential groove and the projections of the second circumferential groove preferably includes a first surface extending in the tire radial direction and a second surface extending at a larger angle than the first surface relative to the tire radial direction.

In the tire according to the present disclosure, preferably, the first surfaces of the projections of the first circumferential groove face the first side in the tire circumferential direction, and the first surfaces of the projections of the second circumferential groove face the second side in the tire circumferential direction.

As a result of adopting the above configuration, the tire according to the present disclosure can exhibit excellent on-snow performance

What is claimed is:

1. A tire comprising a tread portion, wherein
the tread portion includes a first circumferential groove continuously extending in a tire circumferential direction, and a first land portion adjacent to a first side in a tire axial direction of the first circumferential groove,
a groove bottom portion of the first circumferential groove includes a groove bottom reference surface and a plurality of projections projecting outwardly in a tire radial direction from the groove bottom reference surface,
the first land portion has at least one first lateral groove extending from the first circumferential groove and terminating within the first land portion,
in a tread plan view, an entirety of a first lateral groove extension region obtained by extending a connection portion of the first lateral groove at the first circumferential groove to the groove bottom portion of the first circumferential groove so as to be parallel to the tire axial direction is formed on the groove bottom reference surface,
the first land portion has at least one second lateral groove fully traversing the first land portion, and
in a tread plan view, at least a part a projection of the of the plurality of projections overlaps a second lateral groove extension region obtained by extending a connection portion of the second lateral groove at the first circumferential groove to the groove bottom portion of the first circumferential groove so as to be parallel to the tire axial direction.

2. The tire according to claim 1, wherein the first circumferential groove includes first inclined portions inclined relative to the tire circumferential direction and second inclined portions inclined at a larger angle relative to the tire circumferential direction than the first inclined portions, and the first inclined portions and the second inclined portions are provided alternately in the tire circumferential direction.

3. The tire according to claim 2, wherein the first lateral groove communicates with the second inclined portions.

4. The tire according to claim 1, wherein
the tread portion includes a second land portion adjacent to a second side in the tire axial direction of the first circumferential groove, and
the second land portion has a plurality of third lateral grooves fully traversing the second land portion.

5. The tire according to claim 4, wherein each third lateral groove faces the first lateral groove across the first circumferential groove.

6. The tire according to claim 4, wherein
the first circumferential groove includes first inclined portions inclined relative to the tire circumferential direction and second inclined portions inclined at a larger angle relative to the tire circumferential direction than the first inclined portions, and
the first inclined portions and the second inclined portions being provided alternately in the tire circumferential direction, and the third lateral grooves communicate with the second inclined portions.

7. The tire according to claim 1, wherein
a groove width of the first lateral groove continuously decreases toward the first side in the tire axial direction, and
an angle between two groove edges of the first lateral groove is 30 to 50°.

8. The tire according to claim 1, wherein a length in the tire axial direction of the first lateral groove is 15% to 30% of a maximum width in the tire axial direction of the first land portion.

9. The tire according to claim 1, wherein
the tread portion includes a second land portion adjacent to a second side in the tire axial direction of the first circumferential groove, and the second land portion has a plurality of fourth lateral grooves connected to the first circumferential groove and terminating within the second land portion.

10. The tire according to claim 1, wherein, in a cross-section of the first circumferential groove along a longitudinal direction thereof, each projection includes a first surface extending in the tire radial direction, and a second surface extending at a larger angle relative to the tire radial direction than the first surface.

11. The tire according to claim 1, wherein
the tread portion includes a second circumferential groove adjacent to the first side of the first land portion and extending in the tire circumferential direction,
a groove bottom portion of the second circumferential groove includes a groove bottom reference surface and a plurality of projections projecting outwardly in the tire radial direction from the groove bottom reference surface,
in a cross-section of the first circumferential groove or the second circumferential groove along a longitudinal direction thereof, each of the projections of the first circumferential groove and the projections of the second circumferential groove includes a first surface extending in the tire radial direction and a second surface extending at a larger angle than the first surface relative to the tire radial direction,
the first surfaces of the projections of the first circumferential groove face the first side in the tire circumferential direction, and
the first surfaces of the projections of the second circumferential groove face a second side in the tire circumferential direction.

12. The tire according to 1, wherein
the tread portion includes a second land portion adjacent to a second side in the tire axial direction of the first circumferential groove, and
the second land portion has a plurality of third lateral grooves fully traversing the second land portion.

13. The tire according to claim 12, wherein the second land portion has a plurality of fourth lateral grooves connected to the first circumferential groove and terminating within the second land portion.

14. A tire comprising a tread portion, wherein
the tread portion includes a first circumferential groove continuously extending in a tire circumferential direction, and a first land portion adjacent to a first side in a tire axial direction of the first circumferential groove,
a groove bottom portion of the first circumferential groove includes a groove bottom reference surface and a plurality of projections projecting outwardly in a tire radial direction from the groove bottom reference surface,
the first land portion has at least one first lateral groove extending from the first circumferential groove and terminating within the first land portion,
in a tread plan view, an entirety of a first lateral groove extension region obtained by extending a connection portion of the first lateral groove at the first circumferential groove to the groove bottom portion of the first circumferential groove so as to be parallel to the tire axial direction is formed on the groove bottom reference surface,
the first circumferential groove includes first inclined portions inclined relative to the tire circumferential direction and second inclined portions inclined at a larger angle relative to the tire circumferential direction than the first inclined portions, the first inclined portions and the second inclined portions being provided alternately in the tire circumferential direction,
the first lateral groove communicates with the second inclined portion,
the tread portion includes a second land portion adjacent to a second side in the tire axial direction of the first circumferential groove,
the second land portion has a plurality of third lateral grooves, and
each third lateral groove faces the first lateral groove across the first circumferential groove,
the first land portion has at least one second lateral groove fully traversing the first land portion, and
in a tread plan view, at least a part of a projection of the plurality of projections overlaps a second lateral groove extension region obtained by extending a connection portion of the second lateral groove at the first circumferential groove to the groove bottom portion of the first circumferential groove so as to be parallel to the tire axial direction.

15. The tire according to claim 14, wherein the second land portion has a plurality of third lateral grooves fully traversing the second land portion.

16. The tire according to claim 14, wherein
the tread portion includes a second circumferential groove adjacent to the first side of the first land portion and extending in the tire circumferential direction,
a groove bottom portion of the second circumferential groove includes a groove bottom reference surface and a plurality of projections projecting outwardly in the tire radial direction from the groove bottom reference surface,
in a cross-section of the first circumferential groove or the second circumferential groove along a longitudinal direction thereof, each of the projections of the first circumferential groove and the projections of the second circumferential groove includes a first surface extending in the tire radial direction and a second surface extending at a larger angle than the first surface relative to the tire radial direction,
the first surfaces of the projections of the first circumferential groove face the first side in the tire circumferential direction, and
the first surfaces of the projections of the second circumferential groove face the second side in the tire circumferential direction.

* * * * *